US011678767B2

(12) United States Patent
Colston et al.

(10) Patent No.: US 11,678,767 B2
(45) Date of Patent: Jun. 20, 2023

(54) GRILL WITH COMPONENT FEEDBACK AND REMOTE MONITORING

(71) Applicant: Traeger Pellet Grills LLC, Salt Lake City, UT (US)

(72) Inventors: Michael V. Colston, Salt Lake City, UT (US); Daniel W. Sluder, Salt Lake city, UT (US); Daniel A. C. Altenritter, Riverton, UT (US)

(73) Assignee: Traeger Pellet Grills LLC, Salt Lake City, UT (US)

( * ) Notice: Subject to any disclaimer, the term of this patent is extended or adjusted under 35 U.S.C. 154(b) by 1085 days.

(21) Appl. No.: 16/296,081

(22) Filed: Mar. 7, 2019

(65) Prior Publication Data
US 2019/0282032 A1    Sep. 19, 2019

Related U.S. Application Data

(60) Provisional application No. 62/644,878, filed on Mar. 19, 2018.

(51) Int. Cl.
*A47J 37/07* (2006.01)
*A47J 36/24* (2006.01)

(52) U.S. Cl.
CPC ....... *A47J 37/0786* (2013.01); *A47J 36/2477* (2013.01); *A47J 37/0754* (2013.01)

(58) Field of Classification Search
CPC ................ A47J 37/0786; A47J 36/2477; A47J 37/0754; A47J 27/62; A47J 37/0629; A47J 37/0623; A47J 37/0641; A47J 37/0664; A47J 37/079

USPC .................................................... 99/325, 331
See application file for complete search history.

(56) References Cited

U.S. PATENT DOCUMENTS

| | | | | |
|---|---|---|---|---|
| 5,331,128 A | * | 7/1994 | Koh ......................... | H02J 9/062 219/722 |
| 2014/0326233 A1 | * | 11/2014 | Traeger ............... | A47J 37/0704 126/10 |

FOREIGN PATENT DOCUMENTS

KR    10-1635714 B    6/2016

OTHER PUBLICATIONS

Great Britain Search Report from Application No. 1903689, dated May 23, 2019, 6 pages.

* cited by examiner

*Primary Examiner* — Phuong T Nguyen
(74) *Attorney, Agent, or Firm* — TraskBritt (57) ABSTRACT

A solid-fuel grilling device comprises a direct-current power source. A direct-current sensor is in communication with the direct-current power source. The direct-current sensor is configured to gather power characteristic data in relation to the direct-current power source. A solid-fuel grilling component is in communication with the direct-power source. The direct-power source provides power to the solid-fuel grilling component. A processor, in communication with the direct-current sensor, is configured to analyze the power characteristic data and determine operational health of solid-fuel grill components.

9 Claims, 7 Drawing Sheets

GRILL WITH COMPONENT FEEDBACK AND REMOTE MONITORING

CROSS-REFERENCE TO RELATED APPLICATIONS

This application claims priority to and the benefit of U.S. Provisional Application Ser. No. 62/644,878 entitled "GRILL WITH COMPONENT FEEDBACK AND REMOTE MONITORING," filed on Mar. 19, 2018, the entire content of which is incorporated by reference herein in its entirety.

BACKGROUND

Users often prepare food on solid fuel grilling devices such as pellet grills. Pellet grills may burn various fuels, including wood pellets, in order to heat food within the grill. In some cases, the burning pellets may provide flavor to food within the grill, such as a smoke flavor. Further, a user may be able to select particular types of pellets in order to create particular flavors within the grilled food.

Some pellet grills may include a number of components that require electric power, such as ignition starters, pellet fuel feeding systems, and/or blowers. Users may typically plug the grill into a household or other outlet via a power cord to power the grill using alternating current (AC). Various components within the grill itself may wear out or break overtime. Failures in these components may cause the pellet grill to be rendered useless until a repair or replacement part can be provided. Accordingly, there are a number of disadvantages in grilling devices and systems that can be addressed.

BRIEF SUMMARY

Disclosed embodiments comprise a solid-fuel grilling device including a direct-current power source. A direct-current sensor is in communication with the direct-current power source. The direct-current sensor is configured to gather power characteristic data in relation to the direct-current power source. A solid-fuel grilling component is in communication with the direct-power source. The direct-power source provides power to the solid-fuel grilling component. A processor, in communication with the direct-current sensor, is configured to analyze the power characteristic data and determine operational health of solid-fuel grill components.

Additional disclosed embodiments include a computer implemented method for monitoring an operational health of solid-fuel grill components. The method comprises providing power from a direct-current power source to a solid-fuel grilling component. The method additional comprises identifying, with a direct-current sensor, power characteristic data in relation to the direct-current power source. The method also comprises determining, with one or more processors, the operational health of solid-fuel grill components, based upon the power characteristic data.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings summarized below.

DETAILED DESCRIPTION

The present invention relates generally to systems, methods, and devices for grilling and warming food products. In particular, implementations of the present invention relate to pellet grills with component feedback and remote monitoring. In at least one embodiment, electronic components within a solid-fuel grilling device can be monitored for operational health. For example, a direct-current (DC) sensor may monitor power characteristic data at a solid-fuel grilling component with respect to a DC power source. The power characteristics may include measured current levels, measured voltage levels, measured resistance, and any other similar measurement.

Using the power characteristics, one or more processors can identify the operational health of one or more of the solid-fuel grill components. For instance, the one or more processors may identify a reduction current to a particular solid-fuel grilling component when compared to historical current levels provided to the solid-fuel grilling component. Once the reduction in current reaches a threshold level, the one or more processor may determine that failure of the solid-fuel grilling component is imminent. In at least one embodiment, the one or more processors may be distributed within the solid-fuel grilling device, within a mobile computing device (such as a phone) coupled to the solid-fuel grilling device, within a remote server (also referred to herein as a cloud-based server), or within any combination of these devices.

Figure 1:
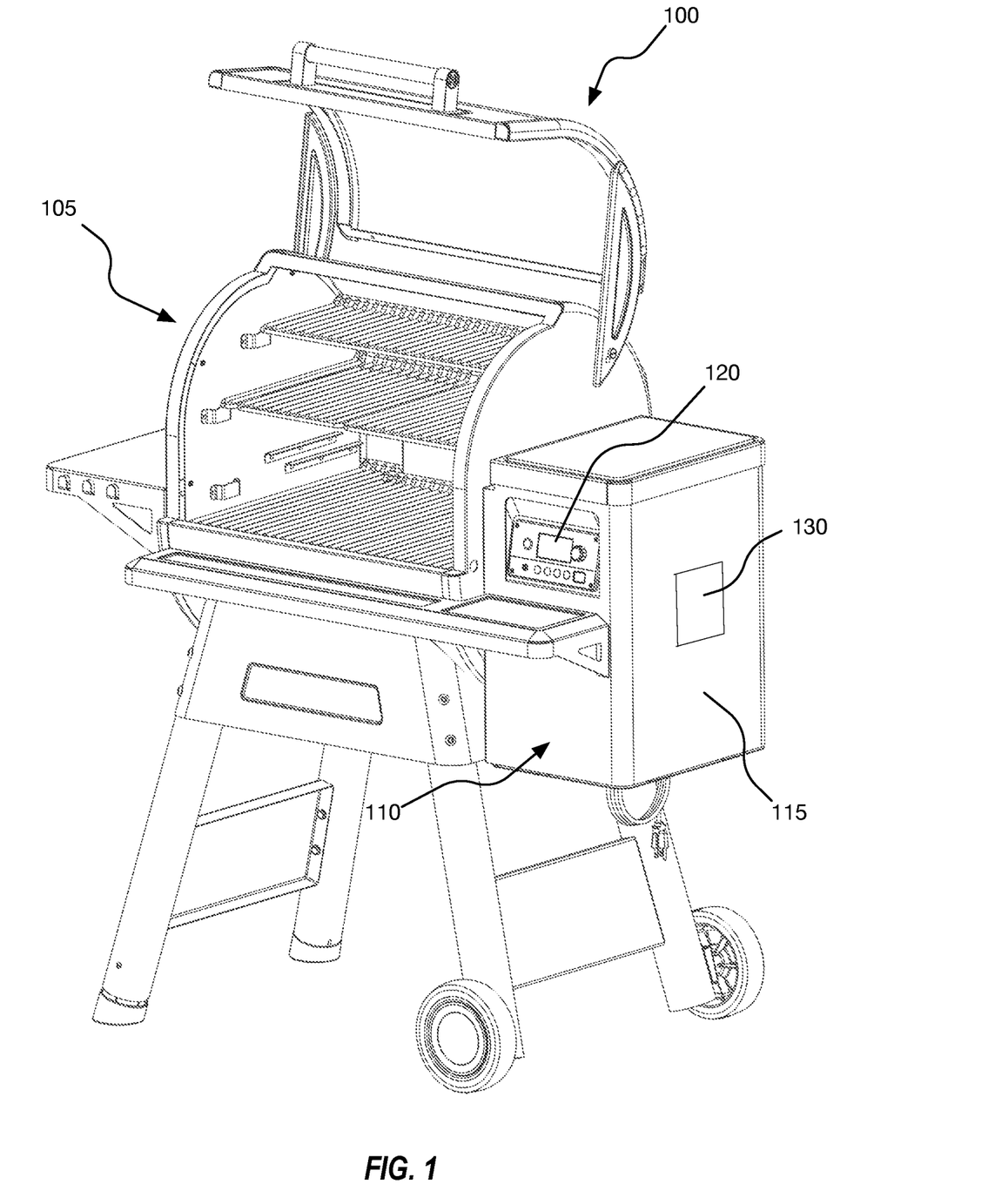
FIG. 1 is an illustration of an embodiment of a solid-fuel grill according to the present disclosure.
Figure 2:
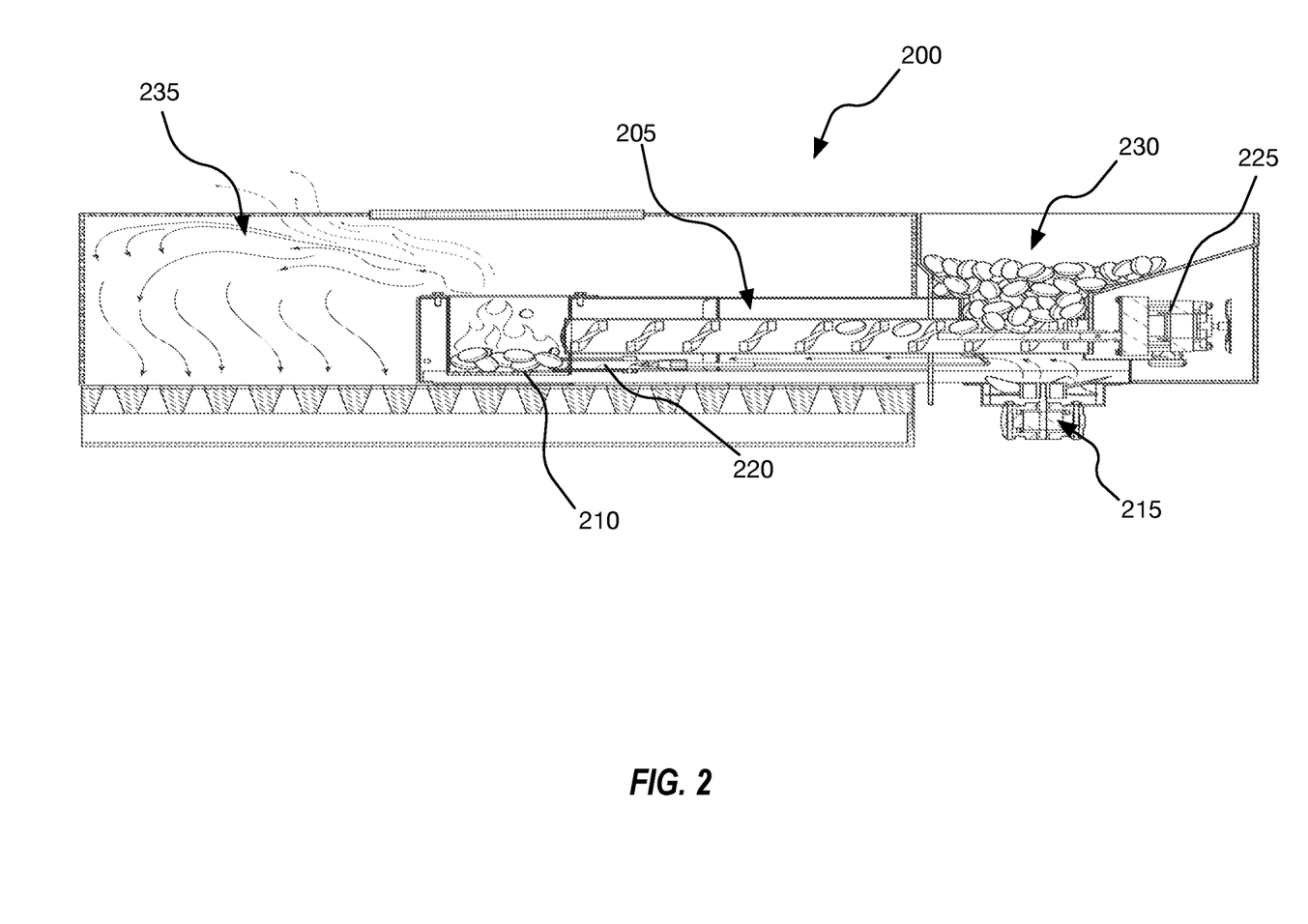
FIG. 2 illustrates an embodiment of an auger feeder system within a solid-fuel grill.

Turning now to the figures, FIG. 1 depicts an embodiment of a solid-fuel grill 100. The solid-fuel grill 100 generally has an upper food warming/cooking compartment 105 in which a user can prepare food. The solid-fuel grill can also have a lower portion 110 that can house an auger feeder system and a firepot. The lower portion 110 of the solid-fuel grill 100 can also include various other components, such as a blower and hot-rod heating element. FIG. 2 shows the auger feeder system 200 and firepot 210, as well as the blower 215 and hot-rod 220, in more detail below.

Referring to FIG. 1, the solid-fuel grill 100 can also include a hopper 115 and a user control interface 120. A user can open the top portion of the hopper 115 and introduce fuel, such as wood pellets, into the feeder system of the lower portion 110 of the grill 100 through the hopper 115. A user can adjust a control knob, or various other control interface buttons, including remote control means, to adjust a temperature of the food warming/cooking compartment 105 of the solid-fuel grill 100. While the depicted user control interface 120 is shown as a physical control unit integrated into the solid-fuel grill, in at least one embodiment, the user control interface 120 may additionally or alternatively comprise a computer-based interface on a device, such as a mobile phone, that is wirelessly connected to the solid-fuel grill 100 through a network connection. As such, as used herein the user control interface 120 comprises any interface through which the user can control the solid-fuel grill 100.

The DC solid-fuel grill 100 can also include a DC power source 130. In the depicted embodiment of a solid-fuel grill 100, the DC power source 130 comprises a lithium-ion battery that attaches to the solid-fuel grill 100. The battery may be removable or non-removable. Other embodiments can include other DC power sources 130. For example, one embodiment can include one or more alkaline batteries, lead-acid batteries, lithium-ion batteries, solar panels, a Peltier plate, a rectifier, or any other type of DC power storage source. A manufacturer can dispose the DC power source 130 at various locations within or on the outside of the solid-fuel grill 100. The DC power source 130 may be connected to a conventional AC power cord that is capable of powering the DC power source 130. Additionally, the DC power source 130 can power the various components of the solid-fuel grill 100, including but not limited to, a user control interface 120 and one or more DC motors that actuate the auger, blower, and/or hot-rod heating element.

FIG. 2 illustrates an embodiment of an auger feeder system 200 within the grill 100 shown in FIG. 1, including an auger 205, firepot 210, blower 215, and hot-rod 220. A DC auger motor 225 can engage the auger 205 and rotate the auger 205. A manufacturer can dispose the firepot 210 at the end of the auger 205 to receive fuel pellets into the firepot 210 through an opening in the side of the firepot 210. The hot-rod 220 can also be disposed at or near the firepot 210. A manufacturer can dispose the blower 215 at or near the lower portion 110 of the solid-fuel grill 100 so that the blower 215 blows air throughout the lower portion 110 and over and/or around the hot-rod 220 and firepot 210. In this way, the blower 215 can aid in the combustion of the fuel inside the firepot 210 by providing oxygen to the firepot 210.

To more clearly explain how the system operates, FIG. 2 illustrates an embodiment of an auger feeder system 200 in use. In this particular embodiment, a user can feed the fuel pellets 230 into the auger 205 via a hopper 115. The DC auger motor 225 can engage the auger 205 and rotate the auger 205. As a result, the rotating auger 205 can feed the fuel pellets 230 into the firepot 210 for combustion, which produces heat and smoke 235.

In at least one embodiment, the blower 215 blows air over the hot-rod 220 and into the firepot 210 where the fuel pellets 230 reside. The DC power source 130 can power the hot-rod 220 so that the hot-rod 220 heats up due to the electrical resistance of the hot-rod 220 and combusts fuel inside the firepot 210. Additionally, the blower 215 can blow air over the heated hot-rod 220 and into the firepot 210. As a result, the hot-rod 220 heats the air as it passes over the hot-rod 220 and the heated air ignites the fuel pellets 230 residing inside the firepot 210. Once sufficiently heated, the fuel pellets 230 produce heat and smoke 235 that rises to warm/heat the heating/grilling surface of the solid-fuel grill 100. Additionally or alternatively, in at least one embodiment, the hot-rod 220 may be in directed contact with the fuel pellets 230 such that heat is directly transferred from the hot-rod to the fuel pellets 230.

In at least one embodiment, the solid-fuel grill 100 provides fine temperature control by adjusting the auger 205, blower 215, and hot-rod 220 simultaneously in various amounts to achieve or sustain specific temperatures. In particular, the solid-fuel grill 100 can provide fine temperature adjustment by adjusting the rate of fuel pellets delivery 230 to the firepot 210, as well as the rate of oxygen available for combustion in the firepot by blower 215. In at least one additional or alternative embodiment, the solid-fuel grill 100 can adjust the temperature of the hot-rod 220 to specific temperature points. In one embodiment, for example, the solid-fuel grill 100 can implement instructions merely to turn the hot-rod 220 on or off in connection with various instructions for blower 215 and auger 205. Additionally or alternatively, the solid-fuel grill 100 can implement instructions to gradually or quickly reach specific temperatures of the hot-rod 220 itself within certain time periods, including slow or fast ramp up and ramp down of the hot-rod 220.

Figure 3:
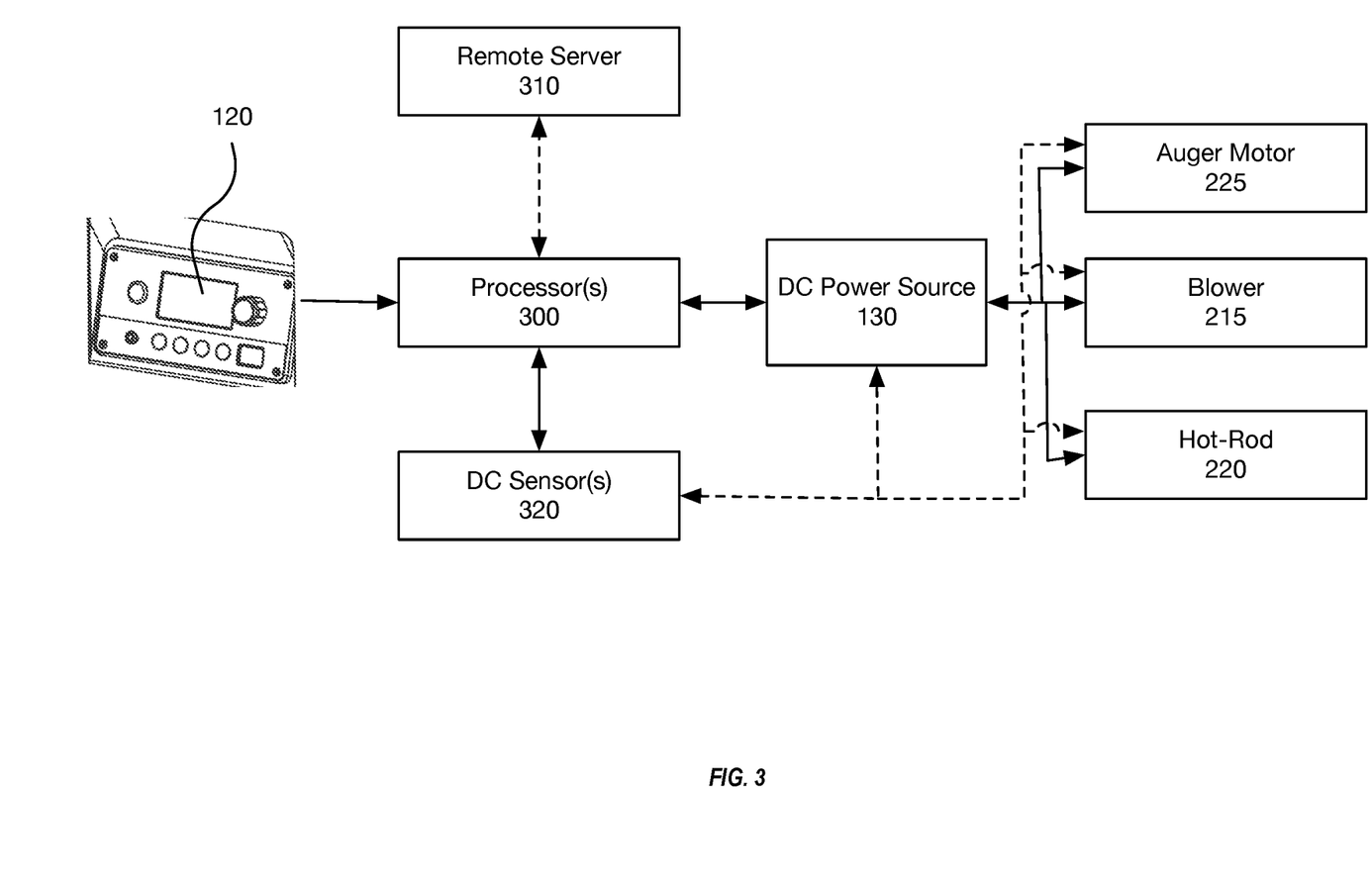
FIG. 3 illustrates a schematic representation of a control system of a solid-fuel grill.

FIG. 3 illustrates a schematic diagram of electrical components within a DC-powered, solid-fuel grill 100. In particular, FIG. 3 illustrates an embodiment of a user control interface 120 in communication with one or more processors 300 within a solid-fuel grill 100. The one or more processors 300 may further be in communication with a remote server 310 (also referred to herein as a cloud-based server), one or more DC sensors 320, and a DC power source 130. In at least one embodiment, the DC power source 130 comprises a DC controller, such as a microprocessor, that is in communication with the one or more processors 300.

In at least one embodiment, the DC power source 130 is further in communication with an auger motor 225, a blower 215, and/or a hot-rod 220. Each of the auger motor 225, the blower 215, and/or the hot-rod 220 may comprise a DC controller for detecting and/or adjusting the operating characteristics of the respective solid-fuel grill components. For example, the auger motor 225 may comprise a DC controller that is capable of adjusting and monitoring the speed of rotation of the auger, the direction of rotation of the auger, and various other similar characteristics. The examples of an auger motor 225, a blower 215, and/or a hot-rod 220 are provided only for the sake of example and explanation. The present invention may incorporate any combination of these disclosed devices and other electronic devices that are useful within a solid-fuel grill.

A user can monitor and/or control various characteristics of the DC power source 130 and/or solid-fuel grill components from the user control interface 120. For example, a user may communicate through the user control interface 120 to adjust a temperature within the solid-fuel grill 100. In response to receiving the communication, a DC controller may communicate a first signal to the DC auger motor 225 and/or the blower 215. The first signal may cause the DC auger motor 225 to actuate at a particular velocity and/or cause the blower 215 to blow air at a particular rate. The ability to control the DC auger motor 225 and/or the blower 215 provides means to adjust the temperature within the solid-fuel grill 100.

In at least one configuration, the hot-rod 220 can comprise ceramic material and two or more electrical leads. In particular, a manufacturer can connect the DC power source 130 to the leads of the hot-rod 220 and provide the hot-rod 220 with electrical current. The DC power source 130 passes current through the hot-rod 220 and the electrical resistance of the hot-rod 220 causes the ceramic material to heat up. One advantage of ceramic material is that ceramics can change temperature at a faster rate than some other materials used in hot-rods of the prior art. Also, ceramic material is very durable and more corrosion resistant than hot-rods of other materials found in the prior art, such as metal.

It will be appreciated, however, that in one or more embodiments, a manufacturer can include a hot-rod 220 comprising materials other than ceramic materials. For example, a manufacturer can include a stainless steel hot-rod or hot-rods comprised of other heat-conducting materials. A manufacturer can include a stainless steel hot-rod for ignition of fuel pellets 230 in the firepot 210 through conductive heat transfer, as described above. Also, a manufacturer can include a ceramic hot-rod for ignition of fuel pellets 230 in the firepot 210 through conductive heat transfer, convective heat transfer, or both. Additionally or alternatively, in at least one embodiment, the hot-rod 220 may comprise a gas ignition system that comprises a gas flame emitting from the hot-rod 220 in order to ignite fuel pellets 230.

Returning to FIG. 3, in at least one embodiment, the user control interface 120 outputs a signal to the one or more processors 300. The one or more processors 300 can utilize one or more DC controllers to adjust the amount of current that the DC power source 130 supplies to the auger motor 225. As the DC power source 130 supplies more power to the auger motor 225, the rotational speed of the auger 205 increases, feeding more fuel pellets 230 into the firepot 210. The increased rate of fuel pellets 230 increases the heat produced in the firepot 210, thus increasing the temperature of the solid-fuel grill 100.

In at least one embodiment, the one or more DC controllers can also operate the blower 215 such that as the auger 205 increases the feed rate of fuel pellets 230 into the firepot 210, the blower 215 also increases speed in order to provide more oxygen to the resulting combustion. Additionally or alternatively, the one or more DC controllers can cause the blower 215 and the auger motor 225 to alternate actuations. In some cases, actuating both the blower 215 and the auger motor 225 simultaneously can cause the DC power source 130 to drain quickly. As such, alternating the blower 215 and the auger motor 225 can reduce the drain of the DC power source 130.

In another embodiment, the solid fuel grill can also include one or more sensors. The one or more sensors can include temperature sensors that the manufacturer can dispose within the warming/cooking compartment 105 of the solid-fuel grill 100. In some embodiments, the manufacturer can dispose the one or more sensors in the firepot 210 to measure the temperature within the firepot 210 during use. In some embodiments, the one or more sensors can sense the temperature of the grill 100 and relay the temperature information to the one or more processors 300 in order to implement proportional, derivative, and/or integral temperature control algorithms.

Additionally, in at least one embodiment, a user can use the hot-rod 220 as a sensor. For example, the one or more processors 300 can shut off power to the hot-rod 220 completely and the temperature of the hot-rod 220 can produce a current that the electrical leads relay back to one or more DC sensors 320. The magnitude of the current produced by the hot-rod 220 can indicate the temperature of the hot-rod 220 and the firepot 210 in which the hot-rod 220 is disposed.

Additionally, the one or more sensors can comprise DC sensors 320 that are configured to gather power characteristic data. The power characteristic data may include current, voltage, and/or resistance received by a solid-fuel grilling component, such as auger motor 225, blower 215, and/or hot-rod 220. The DC sensors 320 may be integrated into the DC power source 130, integrated into the one or more DC controllers, integrated into a solid-fuel grilling component, and/or may comprise one or more separate devices within the solid-fuel grill 100.

For example, turning now to the hot-rod 220 illustrated in FIGS. 2 and 3, one implementation of the present disclosure can include a hot-rod 220 comprising ceramic material, one or more resistive heating elements thermally coupled to the ceramic material, and two or more electrical leads coupled to the heating elements. The DC power source 130 can connect to the leads of the hot-rod 220 and provide the heating elements of the hot-rod 220 with electrical current. The DC power source 130 passes electrical current through the hot-rod 220 and the resistance of the heating elements of the hot-rod 220 causes the ceramic material to heat up.

A user can adjust the temperature of the solid-fuel grill 100 by adjusting the level of current that the DC power source 130 provides to the hot-rod 220. If the heating element of the hot-rod 220 is resistive, this can be accomplished by adjusting the voltage across the electrical leads. For example, this adjustment can be accomplished through pulse width modulation (PWM) of the supplied current. The user can adjust the temperature by manipulating a button, switch, and/or knob on the user control interface 120. The solid-fuel grill 100 can implement both on/off adjustment of the hot-rod 220, as well as gradual voltage adjustments to direct the hot-rod 220 to specific temperature points. As understood more fully below, a ceramic hot-rod can be particularly advantageous in this regard.

In at least one embodiment, the one or more processors 300 can set the voltage that the DC power source 130 feeds to the hot-rod 220 (or the voltage may be fixed). The one or more DC sensors 320 can receive power characteristic data, such as a measured hot-rod current, being provided to the hot-rod 220 by the DC power source 130. The current drawn by the hot-rod 220 for a given voltage input can decrease over time as components of the hot-rod 220 degrade due to the increased resistance of the hot-rod 220. The one or more DC sensors 320 can track this increase in resistance based on the voltage and the current. Alternatively, the resistance of the hot-rod 220 can be measured using a DC sensor that comprises an integrated ohmmeter.

The one or more processors 300 can then compare the measured hot-rod current to a hot-rod current baseline. The hot-rod current baseline can be an average measured hot-rod current over time or be provided by a manufacturer specification. Based at least upon a difference between the measured hot-rod current and the hot-rod current baseline, the one or more processors 300 determine the operational health of the hot-rod 220. For example, if the measured hot-rod current is outside of a threshold distance from the hot-rod current baseline, the one or more processors 300 may generate an indication that the hot-rod 220 is nearing failure and/or needs replaced. Further, in at least one embodiment, the distance between the measured hot-rod current and the hot-rod current baseline may indicate an expected remaining useful lifetime of the hot-rod 220. One will appreciate that while this example utilized the use of current for generating operational health of the hot-rod 220, in additional or alternative embodiments, voltage and/or resistance can also be used.

Also, the one or more processors 300 can set the voltage that the DC power source 130 feeds to the auger motor 225 (or the voltage may be fixed). The one or more DC sensors 320 can receive power characteristic data, such as a measured auger resistance, measured at the auger motor 225 relative to the DC power source 130. The resistance measured at the auger motor 225 can increase over time as components of the auger motor 225 degrade. The one or more DC sensors 320 can track this increase in resistance based on the measured voltage and the measured current. Alternatively, the resistance of the auger motor 225 can be measured using a DC sensor that comprises an integrated ohmmeter.

The one or more processors 300 can then compare the measured auger resistance to an auger resistance baseline. The auger resistance baseline can be an average measured auger resistance over time or be provided by a manufacturer specification. Based at least upon a difference between the measured auger resistance and the auger resistance baseline, the one or more processors 300 determine the operational health of the auger motor 225. For example, if the measured auger resistance is outside of a threshold distance from the auger resistance baseline, the one or more processors 300 may generate an indication that the auger motor 225 is nearing failure and/or needs replaced. Further, in at least one embodiment, the distance between the measured auger resistance and the auger resistance baseline may indicate an expected remaining useful lifetime of the auger motor 225. One will appreciate that while this example utilized the use of resistance for generating operational health of the auger motor 225, in additional or alternative embodiments, voltage and/or current can also be used.

As a further example, the one or more processors 300 can set the voltage that the DC power source 130 feeds to the blower 215 (or the voltage may be fixed). The one or more DC sensors 320 can receive power characteristic data, such as a measured blower current being provided to the blower 215 relative to the DC power source 130. The current drawn by the blower 215 for a given voltage input can change over time as components of the blower 215 degrade due to the changing resistance of the blower 215. The one or more DC sensors 320 can track this change in resistance based on the voltage and the current. Alternatively, the resistance of the blower 215 can be measured using a DC sensor that comprises an integrated ohmmeter.

The one or more processors 300 can then compare the measured blower current to a blower current baseline. The blower current baseline can be an average measured blower current over time or be provided by a manufacturer specification. Based at least upon a difference between the measured blower current and the blower current baseline, the one or more processors 300 determine the operational health of the blower 215. For example, if the measured blower current is outside of a threshold distance from the blower current baseline, the one or more processors 300 may generate an indication that the blower 215 is nearing failure and/or needs replaced. Further, in at least one embodiment, the distance between the measured blower current and the blower current baseline may indicate an expected remaining useful lifetime of the blower 215. One will appreciate that while this example utilized the use of current for generating operational health of the blower 215, in additional or alternative embodiments, voltage and/or resistance can also be used.

By knowing the voltage across these solid-fuel grill components, such as the blower 215 and auger motor 225, the power consumption of the components can be determined over time. Also, by knowing the voltage as well as the amperage through the hot-rod 220, the manufacturer and/or user can determine the resistance of the hot-rod 220. Thus, the manufacturer and/or user can track the average resistance or power consumption of the solid-fuel grill components over time. As the averages increase or decrease outside of thresholds from respective baselines, this is an indication that the components are aging. When the average reaches some threshold, a determination can be made that the components should be replaced. Alternatively, determinations can be made over time to indicate anticipated lifespan, etc. Note that in some embodiments, average amperage to power the components can be tracked instead of the resistance.

Additionally or alternatively, as described above, power characteristic data, such as resistance, can be measured directly for these components using an integral ohmmeter or other appropriate component. Averages over time are used to take into account power characteristic data changes that may occur due to operating conditions (e.g., a warmer ambient environment will increase resistance of the components), flame flare-ups (which will increase resistance) temperature adjustments, etc. An average will smooth these variables over time. The processor can then relay the power characteristic data, such as resistance and/or current information, to a remote server 310, such as a cloud server, which can then relay the information to alert the manufacturer and/or user regarding the status and/or lifespan of each component. This information relayed back to the user control interface 120, including a user control interface 120 being presented on a mobile computing device, such as a mobile phone.

Furthermore, at least one embodiment can determine the operational health of the DC power source 130. For example, a manufacturer can include a DC power sensor, 320 or other means of detection, to determine how much power is left in the DC power source 130. The DC power source 130 can be, for example, a lithium-ion battery, or other type of battery as discussed above. Also, for example, an AC/DC converter disposed in-line with an AC power-source. In one implementation, the one or more processors 300 can receive a power characteristic data regarding the power remaining in the battery and alert the user. For example, the one or more processors 300 can send the operational health information, such as the battery power information, to the user control interface 120, remote server 310, or a mobile app that a user can access through a phone or other mobile device. In at least one embodiment, the one or more processors 300 can also calculate a duration or time remaining until the DC power source 130 ceases to provide power to the grill and/or various components therein and relay that information to the user.

Furthermore, in at least one embodiment, one or more DC sensors 320 can detect the lifespan of the battery or other direct-current power source 130. For example, the one or more DC sensors 320 may be able to detect the ability of the battery charge. This may be accomplished, for example, by measuring the charging current to the battery over time as well as changes in voltage to the battery over time. A user and/or manufacturer can use this operational health information to determine when the battery needs to be replaced, rather than just recharged.

Accordingly, in at least one embodiment, a solid-fuel grilling device, such as a solid-fuel grill 100, comprises a DC power source 130 for powering solid-fuel grill components. One or more DC sensors may be in communication with the DC power source 130. The one or more DC sensors 320 are configured to gather power characteristic data in relation to the DC power source 130. As used herein, power characteristic data in relation to the DC power source 130 comprises any characteristics relating to electrical power usage of power provided by the DC power source 130 to the solid-fuel grill components, such as the auger motor 225, the blower 215, and/or the hot-rod 220. One or more processors 300, in communication with the DC sensor 320, are configured to analyze the power characteristic data and determine operational health of solid-fuel grill components. In at least one embodiment, at least one of the one or more processors 300 is integrated within the DC sensor 320.

Figure 4:
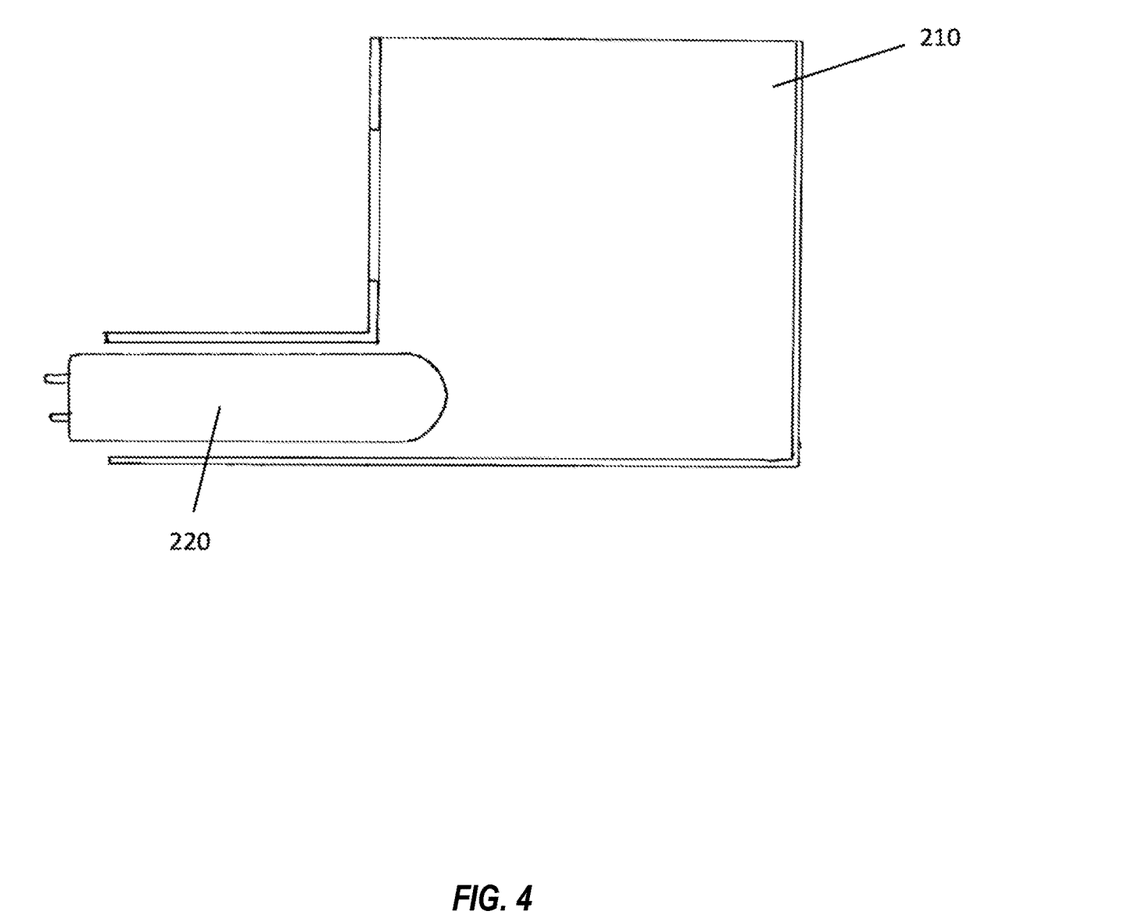
FIG. 4 illustrates a cross-section of an embodiment of a firepot.

Turning now to FIG. 4, FIG. 4 illustrates a cross-sectional view of an embodiment of a firepot 210 with a hot-rod 220 extending therein. In one implementation, the hot-rod 220 extends into the firepot 210 to make direct contact with the fuel pellets residing within the firepot 210 as shown in FIG. 2. In this embodiment, the hot-rod 220 can ignite the fuel pellets within the firepot 210 through conductive heat transfer between the fuel pellets and the hot-rod 220. Additionally, the blower 215 can blow air over the hot-rod 220 and into the firepot 210 to ignite the fuel pellets 230 through convective heat transfer from the heated air to the fuel pellets.

Figure 5:
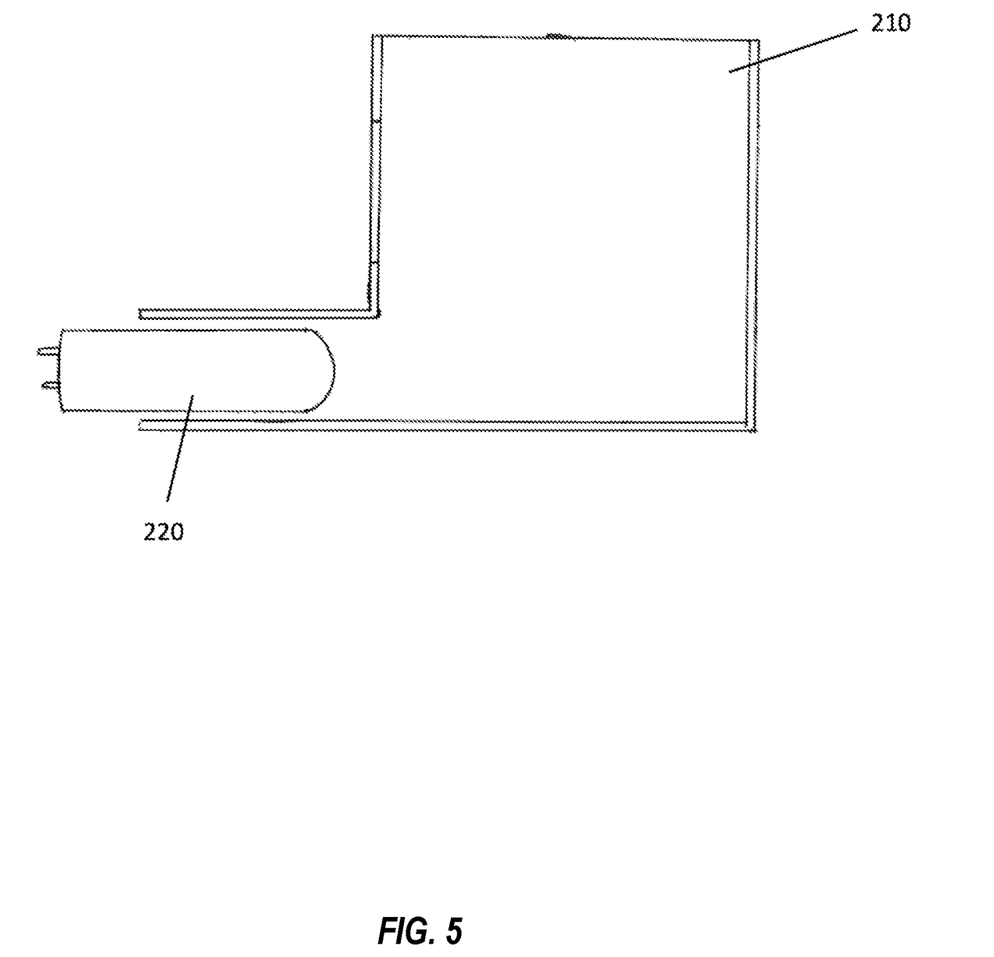
FIG. 5 illustrates a cross-section of another embodiment of a firepot.

FIG. 5 shows an alternative implementation of a hot-rod 220 and firepot 210 configured so that the hot-rod 220 does not make contact with the fuel pellets, such as in the case of a ceramic hot-rod. In this implementation, the hot-rod 220 does not extend into the main chamber of the firepot 210. Accordingly, the hot-rod 220 does not ignite the fuel pellets in the firepot 210 through direct contact. Rather, in this non-contact configuration, the blower 215 blows air over (or in some embodiments, through) the hot-rod 220 and into the firepot 210 to ignite the fuel pellets through convective heat transfer only, as described above.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
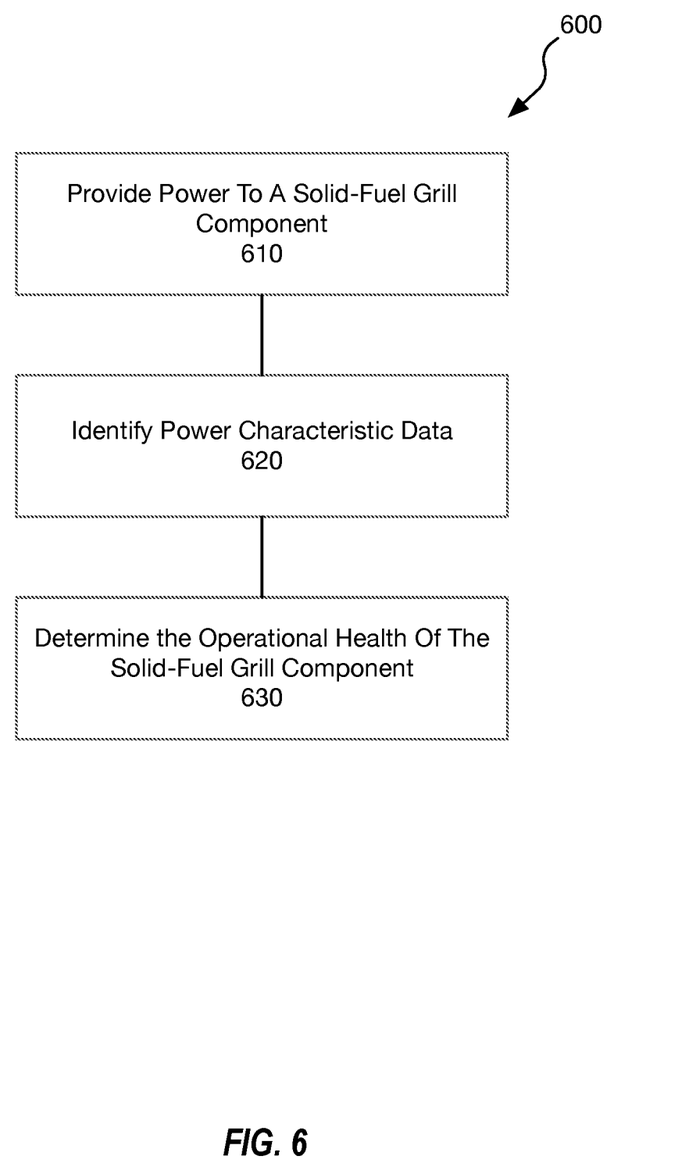
FIG. 6 illustrates a schematic representation of an embodiment of a method for monitoring an operational health of solid-fuel grill components.

FIG. 6 illustrates various steps in a flowchart for a method 600 of monitoring an operational health of solid-fuel grill components. The method 600 includes an act 610 of providing power to a solid-fuel grill component. Act 610 comprises providing power from a DC power source 130 to a solid-fuel grilling component. For example, FIG. 3 and the accompanying description, describe a DC power source 130 powering various solid-fuel grilling component, such as an auger motor 225, a blower 215, and/or a hot-rod 220.

Additionally, FIG. 6 illustrates that the method 600 can include an act 620 of identifying power characteristic data. Act 620 comprises identifying, with a DC sensor 320, power characteristic data in relation to the DC power source 130. For example, FIG. 3 and the accompanying description describe one or more DC sensors 320 that are able to measure power characteristic data in the form of at least voltage, current, and/or resistance. This power characteristic data is measured with respect to the power provided by the DC power source 130.

Further, FIG. 6 illustrates that the method 600 can include an act 630 of determining the operational health of the solid-fuel grill component. Act 630 comprises determining, with one or more processors 300, the operational health of solid-fuel grill components, based upon the power characteristic data. For example, FIG. 3 and the accompanying description describe the one or more processors 300 comparing measured power characteristic data to baseline power characteristic data. When the measured power characteristic data is outside of a threshold from the baseline power characteristic data, the one or more processors 300 determine that a solid-fuel grilling component is failing or nearing failure.

Figure 7:
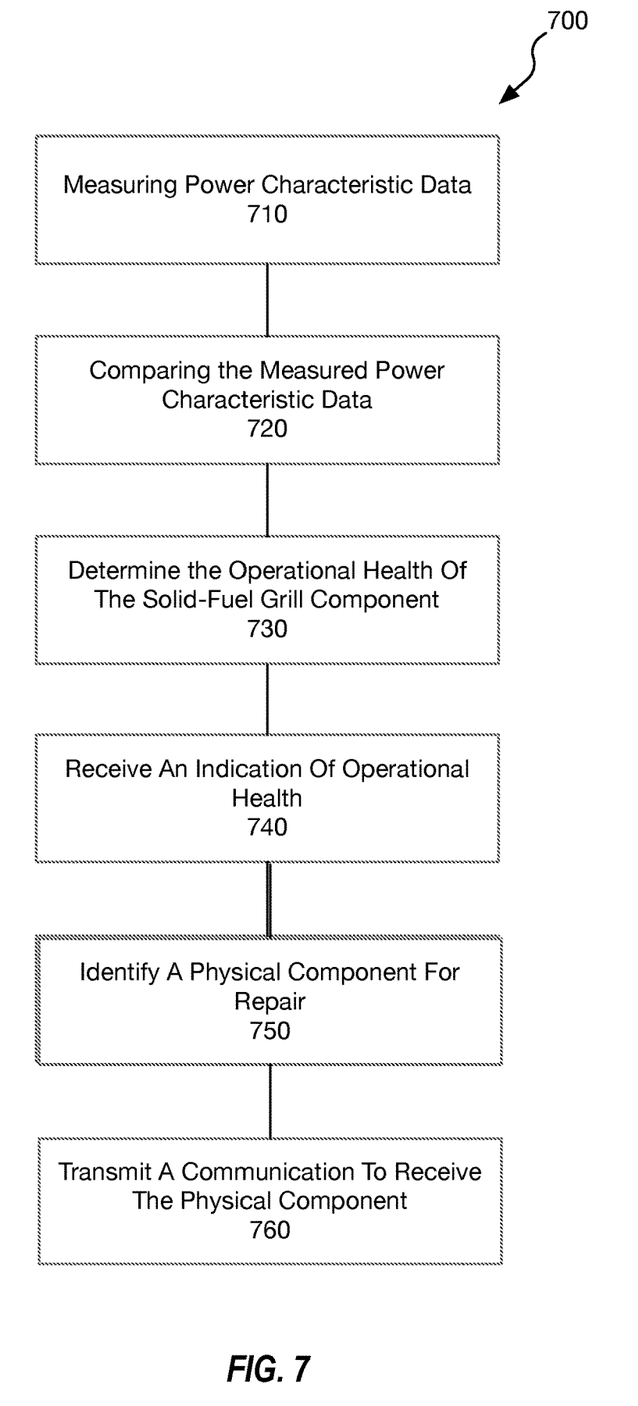
FIG. 7 illustrates a schematic representation of an embodiment of another method for monitoring an operational health of solid-fuel grill components.

In an additional or alternative embodiment, FIG. 7 illustrates various steps in a flowchart for a method 700 of monitoring an operational health of solid-fuel grill components. The method 700 includes an act 710 of measuring power characteristic data. Act 710 measuring, with a DC sensor 320, power characteristic data associated with a solid-fuel grilling component. For example, FIG. 3 and the accompanying description describe one or more DC sensors 320 that are able to measure power characteristic data in the form of at least voltage, current, and/or resistance. This power characteristic data is measured with respect to the power provided by the DC power source 130.

FIG. 7 also illustrates that the method 700 can include an act 720 of comparing the measured power characteristic data. Act 720 comprises comparing the measured power characteristic data to a power characteristic data baseline. For example, FIG. 3 and the accompanying description describe the one or more processors 300 comparing measured power characteristic data to baseline power characteristic data. The baseline power characteristic data may be determined by averages or may be provided by a manufacturer.

FIG. 7 additionally illustrates that the method 700 can include an act 730 of determining the operation health of the solid-fuel grill components. Act 730 can comprise based at least upon a difference between the measured power characteristic data and the power characteristic data baseline, determine the operational health of the solid-fuel grilling component. For example, FIG. 3 and the accompanying description describe that when the measured power characteristic data is outside of a threshold from the baseline power characteristic data, the one or more processors 300 determine that a solid-fuel grilling component is failing or nearing failure.

In addition, FIG. 7 illustrates that the method 700 can include an act 740 of receiving an indication of operational health. Act 740 comprises receiving, at a remote server 310, an indication of the operational health of the solid-fuel grilling component. For example, FIG. 3 and the accompanying description describe a remote server 310 that the one or more processors 300 communicate to. The remote server 310 receives operational health data relating to the various solid-fuel grill components within the solid-fuel grill 100.

Further, FIG. 7 illustrates that the method 700 can include an act 750 of identifying a physical component for repair. Act 750 comprises identifying a physical component necessary to repair the solid-fuel grilling component. For example, FIGS. 2 and 3 and the accompanying description describe various solid-fuel grill components, such as the auger motor 225, the blower 215, and the hot-rod 220. The remote server 310 may be configured to determine that a completely new auger motor 225 is necessary to repair a broken auger motor 225, in such a case, a repair comprises a replacement.

Further still, FIG. 7 illustrates that the method 700 can include an act 760 of transmitting a communication to receive the physical component. Act 760 can comprise transmitting, to a user of the solid-fuel grill component, a communication indicating an option to receive the physical component. For example, in at least one embodiment, the user control interface 120 can receive a communication from the remote server 310 providing the option to order the physical component. As explained above, the user control interface 120 may comprise a display integrated into the solid-fuel grill and/or a user interface on a mobile computing device, such as a mobile phone.

Accordingly, as described herein, various methods and systems are provided that are capable of proactively monitoring the operational health of solid-fuel grill components. Prior to solid-fuel grilling component failing or immediately after their failure, one or more processors 300 can communicate the operational health information to a remote server 310. The remote server 310 can then proactively provide a user with options to immediately purchase replacement parts or request service. Further, the remote server 310 can provide instructions to a user regarding how the repairs, including replacements, should be performed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS")), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc., for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A solid-fuel grilling device, comprising:
    a direct-current power source;
    a direct-current sensor in communication with the direct-current power source, the direct-current sensor configured to gather power characteristic data in relation to the direct-current power source;
    a solid-fuel grilling component in communication with the direct-current power source, the direct-current power source providing power to the solid-fuel grilling component;
    at least one processor, in communication with the direct-current sensor and;
    at least one non-transitory computer-readable storage medium storing instructions thereon that when executed by the at least one processor, cause the solid-fuel grilling device to: measure power characteristic data associated with the solid-fuel grilling device, compare the measured power characteristic data to power characteristic data baseline; and
    determine an operational health of the solid-fuel grilling component based on a difference wherein the solid-fuel grilling component comprises a blower; an auger motor, or a hot-rod.

2. The solid-fuel grilling device of claim 1, wherein the processor is integrated within the direct-current sensor.

3. The solid-fuel grilling device of claim 1, wherein the power characteristic data comprises a measurement of one or more of a current provided to a particular solid-fuel grilling component, a voltage provided to the particular solid-fuel grilling component, or a resistance measured at the particular solid-fuel grilling component.

4. The solid-fuel grilling device of claim 1, wherein the direct-current power source is a battery.

5. The solid-fuel grilling device of claim 1, wherein the operational health of the solid-fuel grilling component is indicative of a measured reduction in an electrical current provided to the solid-fuel grilling component compared to a historical measured electrical current level of the solid-fuel grilling component.

6. The solid-fuel grilling device of claim 5, the at least one non-transitory computer-readable storage medium storing instructions thereon that, when executed by the at least one processor, cause the solid-fuel grilling device to determine that failure of the solid-fuel grilling component is likely responsive to the measured reduction in the electrical current provided to the solid-fuel grilling component exceeding a predetermined electrical current reduction level threshold.

7. The solid-fuel grilling device of claim 1, wherein the power characteristic baseline is based, at least in part, on an average of two or more measurements of historical power characteristic data.

8. The solid-fuel grilling device of claim 1, the at least one non-transitory computer-readable storage medium storing instructions thereon that, when executed by the at least one processor, cause the solid-fuel grilling device to send an indication of the operational health of the solid-fuel grilling component to a remote server.

9. The solid-fuel grilling device of claim 8, the at least one non-transitory computer-readable storage medium storing instructions thereon that, when executed by the at least one processor, cause the solid-fuel grilling device to receive, from the remote server, an indication that solid-fuel grilling device should be repaired or replaced.

* * * * *

UNITED STATES PATENT AND TRADEMARK OFFICE
CERTIFICATE OF CORRECTION

| | | |
|---|---|---|
| PATENT NO. | : 11,678,767 B2 | |
| APPLICATION NO. | : 16/296081 | |
| DATED | : June 20, 2023 | |
| INVENTOR(S) | : Michael V. Colston, Daniel W. Sluder and Daniel A. C. Altenritter | |

It is certified that error appears in the above-identified patent and that said Letters Patent is hereby corrected as shown below:

In the Claims

| | | | |
|---|---|---|---|
| Claim 1, | Column 13, | Line 49, | change "that when" to --that, when-- |
| Claim 1, | Column 14, | Line 1, | change "device to: measure" to --device to: measure-- |
| Claim 1, | Column 14, | Line 2-3, | change "device, compare" to --device; compare-- |
| Claim 1, | Column 14, | Line 3-4, | change "data to power" to --data to a power-- |
| Claim 1, | Column 14, | Line 6, | change "difference wherein" to --difference between the measured power characteristic and the power characteristic baseline, wherein-- |

Signed and Sealed this
Fifteenth Day of August, 2023

Katherine Kelly Vidal
*Director of the United States Patent and Trademark Office*